United States Patent Office 2,794,348
Patented June 4, 1957

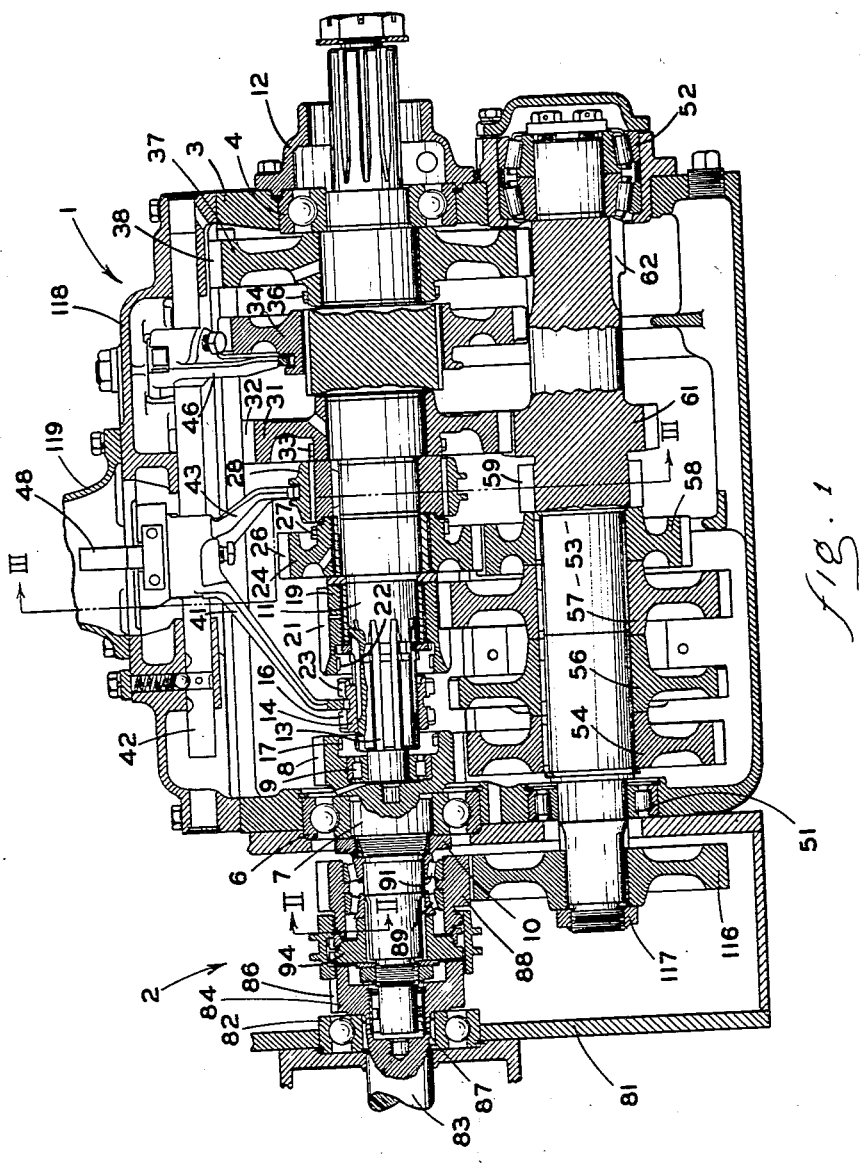

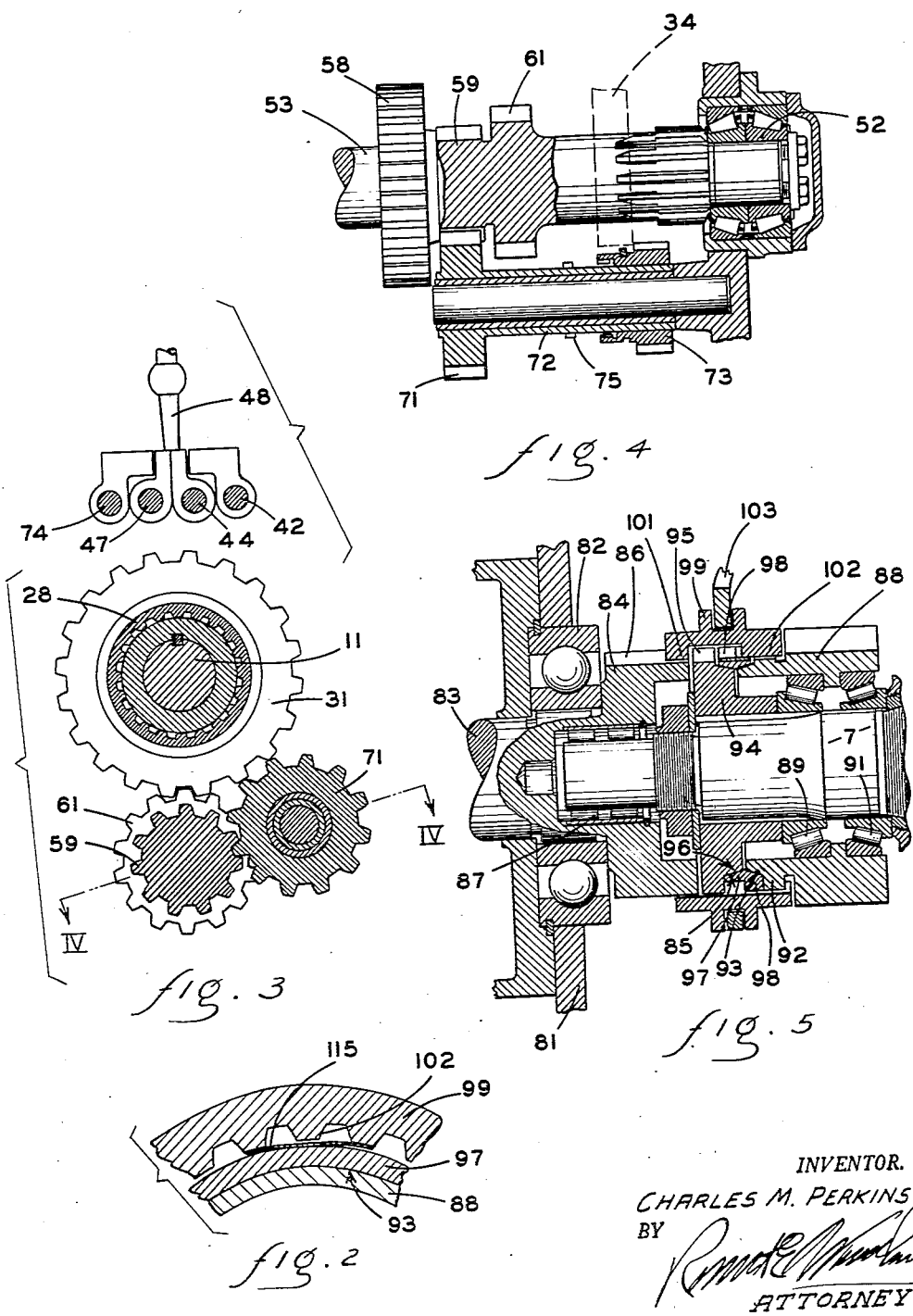

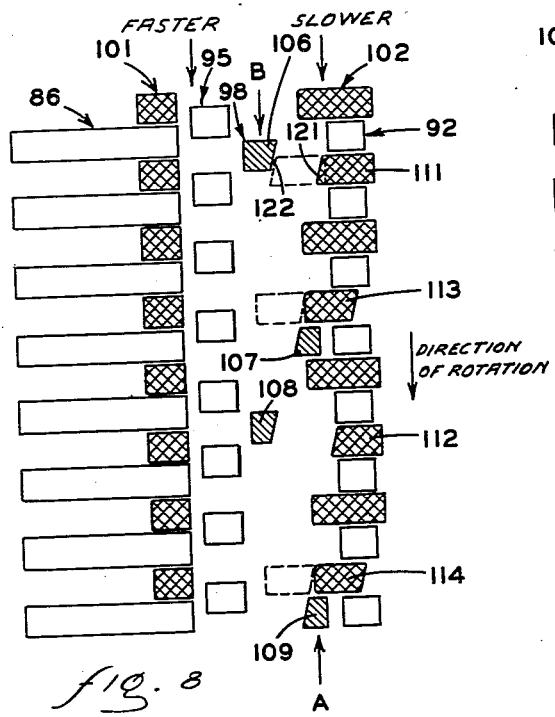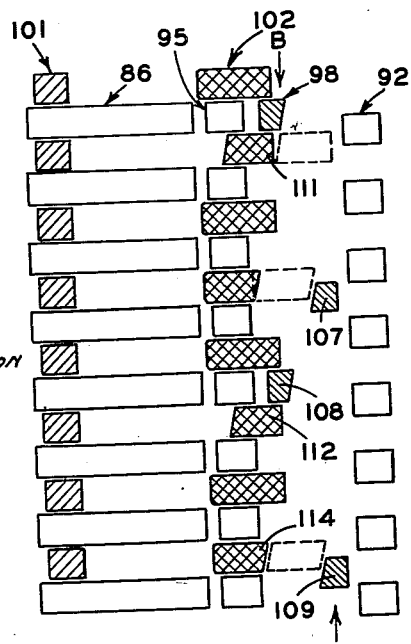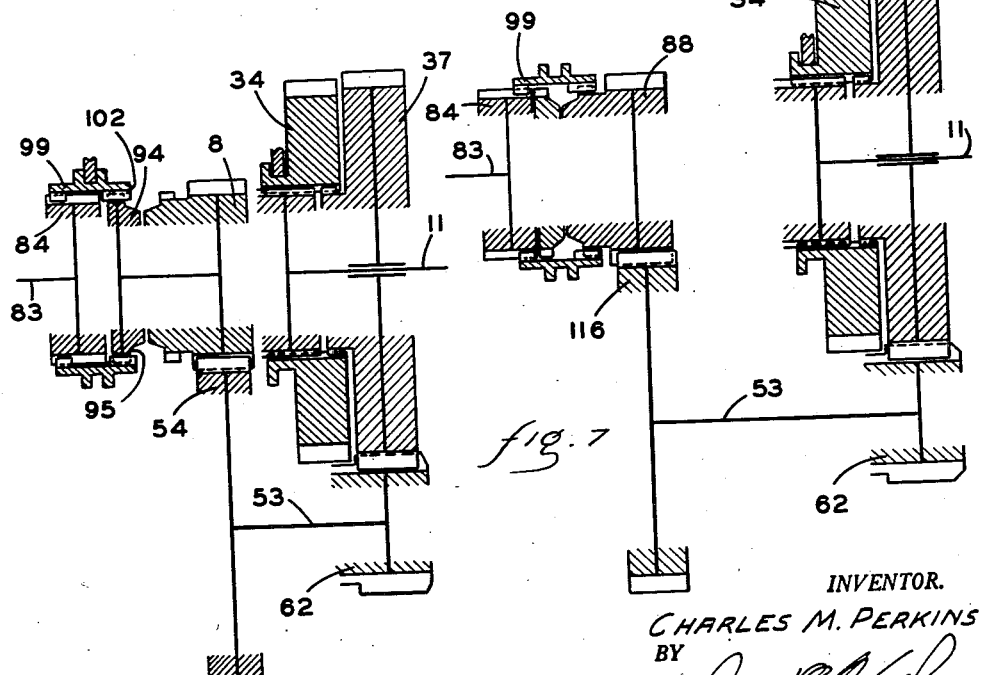

2,794,348
CHANGE SPEED GEARING

Charles M. Perkins, Kalamazoo, Mich., assignor to Fuller Manufacturing Company, a corporation of Delaware Application June 17, 1954, Serial No. 437,337

6 Claims. (Cl. 74—745)

This invention relates to a change speed gearing assembly and particularly to a type thereof including supplementary change speed gears serially and alternately connectable to the gear ratios of a main change speed gear unit.

In the progress of any art, there is constant effort being expended to improve the apparatus or processes pertinent thereto. In the case of transmissions, such effort is directed, among other things, toward means to improve the ease of shifting, to improve the rapidity of shifting, to reduce the complexity of the mechanism and to reduce its cost. Hence, without detracting from the operability or desirability of many of the mechanisms previously known, it may be stated that in the present mechanism these general objectives are accomplished to an even greater degree than has been known previously.

Specifically, a principal object of the invention has been to provide a change speed gear assembly in which the desired number of gear ratios may be obtained with a fewer number of gear units than, insofar as I am aware, was known previously.

A further object of the invention has been to provide an apparatus in which the objective aforesaid may be accomplished by apparatus operable by the operator in a manner substantially similar to present "gear splitting" types of main transmission and auxiliary transmission assemblies.

A further object of the invention has been to provide apparatus, as aforesaid, in which the main part of the mechanism is only slightly modified from previously known main transmissions and the purposes of the invention are accomplished by novel supplementary gears acting in a novel manner in association with said modified main transmission.

A further object of the invention is to provide apparatus, as aforesaid, in which the supplementary gears require materially less space than is required by presently known arrangements utilizing an auxiliary transmission.

A further object of the invention is to provide apparatus, as aforesaid, in which synchronizers of smaller size than was previously customary may be utilized.

A further object of the invention is to provide apparatus, as aforesaid, in which the parts whose inertia is to be overcome by the synchronizer of the supplementary gears are reduced to a minimum.

A further object of the invention is to provide a device, as aforesaid, having a wide range of flexibility in choice of ratios available throughout the shifting range.

A further object of the invention is to provide a device, as aforesaid, which can be manufactured at a minimum cost.

A further object of the invention is to provide a device, as aforesaid, which can be hand shifted and which, alternatively, may be readily adapted to power shifting, either in whole or in part.

A further object of the invention is to provide a device, as aforesaid, in which two of the gears of the main transmission are utilized in association with the supplementary gears in two different ways in order to obtain the desired reduction in the total number of gears needed.

A further object of the invention is to provide a device, as aforesaid, in which the parts are capable of manufacture in a simple and sturdy manner in order to minimize the maintenance required in connection with the resulting apparatus.

A further object of the invention is to provide a device, as aforesaid, in which the synchronizing required for shifting of the supplementary gears can be effected extremely rapidly and hence minimize the total time required for effecting a complete shift.

Other objects and purposes of the invention will be apparent to persons acquainted with devices of this general type upon a reading of the following disclosure and a study of the accompanying drawings.

In the drawings:

Figure 1 is a general view in central section of apparatus embodying the invention.

Figure 2 illustrates a section taken on the line II—II of Figure 1.

Figure 3 is a partially schematic section taken on the line III—III of Figure 1.

Figure 4 is a section taken on the line IV—IV of Figure 3.

Figure 5 is a view of a portion of Figure 1 redrawn on an enlarged scale.

Figure 6 is a diagrammatic view illustrating the position of the gears through which driving is accomplished in one operating position of the mechanism.

Figure 7 is a diagrammatic view illustrating another position of the gears through which driving is accomplished in another operating position of the mechanism.

Figure 8 is a diagrammatic view of the tooth pattern of the synchronizer unit shown in one operating position.

Figure 9 is a view similar to Figure 8 showing another operating position.

IN GENERAL

In meeting the objects and purposes above set forth, I have provided certain supplementary gears at the forward end of a modified main change speed unit and serially connected therewith. A clutch is provided in the supplementary gears and in one position thereof the supplementary gears drive the main change speed gears directly and in another position of said clutch the supplementary gears drive the main gears through the countershaft of the main unit. Gear ratios in the supplementary gears may be so arranged that said main unit is driven by said two settings of the supplementary gears at speeds having a ratio with respect to each other corresponding to any selected portion, as one half, of the normal step between adjacent ratios normally available in the main unit.

DETAILED DESCRIPTION

Turning now to the drawings in more detail, and referring first to Figure 1, there is shown gearing which for convenience in reference may be termed the main gear group 1 and the supplementary gear group 2, although it will be apparent from the following description that these gear groups are actually intimately related to each other and not truly separable in their functions. While the main gear group may be largely similar to any one of many standard types, a brief description of the particular form herein shown for illustrative purposes will be given in the interest of completeness.

Said main gear group includes a housing 3 having aligned openings at either end thereof for the reception of the bearings 4 and 6. Bearing 6 supports one end of an intermediate shaft 7, the other end of which is supported within the supplementary gears as explained further hereinbelow. The inner (rightward) end of said intermediate shaft 7 has a first countershaft driving gear 8 formed thereon, said gear having a bearing 9 contained concentrically therein holding the leftward end of the main shaft 11. A point near the rightward end of said main shaft 11 is supported by the bearing 4. The extreme rightward end of said main shaft is connected in any suitable manner to the apparatus to be driven by the transmission. The bearing 4 is retained in position by a cap 12. The bearing 6 is held in place by the nut 10. A point near the leftward end of said main shaft is provided with the splines 13 to which is fitted the sleeve 14. Said sleeve 14 is externally provided with clutch teeth 16 capable of meshing with internal clutch teeth 17 provided on the gear 8. A gear 19 is mounted on, and for rotation with respect to, the shaft 11 and is provided with external teeth 21 and with internal teeth 22. Teeth 23 on the sleeve 14 are provided for meshing with said internal teeth 22.

The gear 24 is mounted on, and for rotation with respect to, the shaft 11 and carries both the drive teeth 26 and the clutch teeth 27. A sleeve 28 is splined for rotation with, but horizontal sliding with respect to, the shaft 11 and includes internal clutch teeth engageable with the clutch teeth 27. A gear 31 is provided with external drive teeth 32 and with clutch teeth 33 also engageable with the internal teeth of the sleeve 28. Said gear 31 is mounted on, and for rotation with respect to, the shaft 11. A sleeve gear 34 is slidably splined onto the shaft 11 for rotation therewith and horizontal sliding with respect thereto and includes internal clutch teeth engageable with the clutch teeth 36 of the gear 37, said gear 37 being mounted rotatably with respect to the shaft 11 and being provided also with external drive teeth 38.

The sleeve 14 is axially moved by the shift fork 41 which in turn is movable by the shift rod 42 (Figures 1 and 3). The sleeve 28 is movable by the shift fork 43 which is mounted on and movable by the shift rod 44. The sliding gear 34 is moved by the shift fork 46 which is mounted on and movable by the shift rod 47. The shift rods are operated in the usual manner by a shift lever of which the lower end is indicated at 48.

Said housing 3 also contains further coaxial openings within which are received the bearings 51 and 52. A countershaft 53 is supported within these bearings and extends forwardly (leftwardly) of the forward end of the housing 3 for purposes appearing hereinafter. Splined to the countershaft 53 is the gear 54, a power takeoff gear 56, a gear 57 and a gear 58. The reverse pinion 59 is in this instance formed on the shaft 53 as are also the pinions 61 and 62.

The gear 54 is in constant mesh with the gear 8, the gear 57 is in constant mesh with the gear 19 and the gear 58 is in constant mesh with the gear 24. The reverse pinion 59 is in constant mesh with the gear 71 (Figures 3 and 4) on the reverse countershaft 72 and the pinion 61 is in constant mesh with the gear 31. The pinion 62 is in constant mesh with the gear 37.

The reverse countershaft 72 supports a sliding gear 73 which is axially movable through conventional means by the shift rod 74 (Figure 3) into and out of mesh with both the clutch teeth 75, extending from the reverse countershaft 72, and the main shaft gear 34.

It will be understood, of course, that the above described specific apparatus is only illustrative of the invention and that many other types of main gearing arrangements may be substituted therefor.

Turning now to the supplementary gear group 2, there may be provided a housing 81 which is connected in any convenient manner (by means not shown) to the forward end of the housing 3 of the main gear group. The housing 81 has an opening receiving a bearing 82 which bearing is positioned coaxially with the bearing 6. Within said bearing 82 is supported the rearward end of a drive shaft 83, the forward end being connected to any convenient drive means such as the driven side of a clutch assembly. The clutch element 84 is formed on the rearward end of the drive shaft 83 and said clutch element is provided with axially elongated splines 86 for reasons appearing hereinafter. A bearing 87 is provided concentrically within the clutch element 84 for supporting the forward end of the intermediate shaft 7 coaxially with, but in rotatable relation with the drive shaft 83. A second countershaft driving gear 88 is provided adjacent the rearward wall of the housing 81 and is supported on, and rotatably with respect to, the shaft 7 by the bearings 89 and 91 (Figures 1 and 5). The forward end of the gear 88 is provided with clutch teeth 92 (Figure 5 only) and with a tapered or friction surface 93 for purposes appearing hereinafter.

The gear 116 is fastened to the leftward end of the shaft 53 for rotation therewith and in this particular embodiment is held in position by the nut 117. Said gear is in constant mesh with the gear 88.

The main transmission housing 3 is preferably closed by a removable cover 118 to which the shift lever support housing 119 is fastened in a conventional manner. The auxiliary housing 81 is closed by any convenient cover plate, not shown. A clutch element 94 is positioned between the clutch element 84 and gear 88 and is splined to the shaft 7 for rotation therewith. Said clutch element 94 includes a tapered or friction surface 85 and clutch teeth 95. A synchronizing ring 97 encircles the tapered surfaces 93 and 85 and has internally tapered surfaces 90 and 96 to correspond with each thereof. Said synchronizing ring has external balk teeth 98 (Figures 5, 8 and 9) which are arranged in two rows "A" and "B" as explained hereinafter in more detail. A sleeve 99 is provided with a first row of internal clutch teeth 101 engaging the splines 86 of the clutch element 84 and said sleeve also has a second row of internal clutch teeth 102 engaging, in the position of the apparatus as shown in Figures 5 and 8, both the clutch teeth 92 and row "A" of the balk teeth 98. A fork 103 is provided for shifting the sleeve 99 in a conventional manner.

Turning now to the details of the teeth 92, 95 and 98, attention is directed primarily to Figures 8 and 9. In the drawing (Figure 8) the position of the balk teeth 98 of the synchronizing ring is shown by the single line shaded areas. The position of the teeth 101, 102 on the sleeve 99 is shown by the criss-cross lined areas. Individual balking teeth are indicated at 106, 107, 108 and 109. The right hand row A of said teeth 98 are equally spaced circumferentially from each other and are spaced a multiple of the spacing of the teeth 102. The left hand row B of the teeth 98 are likewise equally spaced circumferentially from each other and are spaced a multiple of the spacing of the teeth 95, this spacing being, of course, equal to the spacing of the teeth 102. However, the teeth of the row A are spaced circumferentially from the teeth of the row B a distance which is a multiple of the spacing of the teeth 102 plus a distance sufficient to secure effective blocking, such as one-quarter or one-half of the thickness of teeth 102. The teeth 98 are individually of such circumferential dimension that they can slide snugly but easily between the teeth 102. The teeth of the row A are chamfered at approximately a 20 degree angle at their leftward ends and the teeth of the row B are similarly chamfered at their rightward ends. Those of the teeth 102 which lie in a first circumferential direction, downwardly as appearing in Figure 8, from, and immediately adjacent, each of the teeth in row B of teeth 98 are chamfered at their leftward ends as indicated by the teeth 111 and 112 to cooperate with the chamfer on the said adjacent teeth of row B. Those of said teeth 102 which lie in a second circumferential direction, upwardly as appearing in Figure 8, from, and immediately adjacent, each of the teeth of row A of the teeth 98 are chamfered at their rightward ends as shown by teeth 113 and 114 to cooperate with the chamfer on the said adjacent teeth of row A.

A spring 115 (Figure 2) is affixed to the synchronizing ring 97 to bear against the radially inward surfaces of the teeth 102. This effects axial urging of the synchronizing ring in the direction of movement of the sleeve 99 at the beginning of a shifting operation, and thereby effects an initial engagement of the synchronizing ring 97 with one of the friction surfaces 93 or 85. Thus there is secured a fully guided passageway for the movable clutch teeth 102 in all of their several positions.

Operation

With power applied to the drive shaft 83, the clutch element 84 is caused to rotate. With the parts in the position as shown in Figures 1 and 5, rotation of the clutch 84 acts through the sleeve 99 and the teeth 92 to rotate the gear 88. This effects rotation of the gear 116 which rotates the countershaft 53. Rotation of said countershaft rotates all of the gears mounted for rotation with said countershaft and rotates each of the gears mounted on the main shaft which are in constant mesh with the several gears and pinions on the countershaft. With the sleeve 99 in its leftward position, rotation of the clutch element 84 will act through said sleeve to rotate the clutch element 94 and through it to rotate the shaft 7. This effects rotation of the gear 8. Thus, instead of the conventional half-step auxiliary transmission utilizing four gears and clutch mechanism, the apparatus of the invention requires supplementary elements involving only two gears and a clutch mechanism. Further, because of the changed relationship of these parts, all of the supplementary elements may be normally received within a spect usually not more than one-half of the axial distance required for an auxiliary transmission of the conventional type.

Figures 6 and 7 show schematically the arrangement of the gears during the two operative positions of the supplementary elements.

It will be recognized that in either position of the supplementary elements the shift lever 48 may be actuated to place any of the gears within the main housing 3 in any desired connection so that the full shifting range may be had in either position of the supplementary elements and the selection of the shifting ratios within the main housing is not dependent upon the operation of the supplementary elements.

In more detail, it may be assumed first that the supplementary elements are in the position indicated schematically in Figure 6, namely, with the sleeve 99 in a leftward position so that its internal teeth 102 engage the teeth 95 of the clutch element 94. Thus, power is transmitted at a one-to-one ratio to the gear 8. With the sleeve 14 in its neutral position, and the sleeve gear 34 in its rightward position, power is transmitted from the gear 8 to the gear 54, thence to the countershaft 53, to the pinion 62, to the gear 37, to the sleeve gear 34 and finally to the main shaft 11. This is the lowest position. Now, without changing position of the gears within the main housing 3, the sleeve 99 is moved rightwardly into the position shown in Figures 1 and 7. This connects the power delivered at the clutch element 84, through clutch element 94, through the gears 88 and 116 to the countershaft 53. While the gear 8 now actually idles, this is the same insofar as power relationships are concerned as though the gear 8 were being driven at a slightly higher ratio than previously inasmuch as the gear 88 by which the countershaft is now being driven is larger than the gear 8. Thus the power ratio decreases one-half step and the speed ratio increases correspondingly. This is the second lowest position.

For the third gear position, the sleeve 99 is returned to its leftward position (Figure 6) and the sleeve 34 is moved leftwardly into its neutral position. The shift lever is now operated to move the sleeve 28 rightwardly to engage the clutch teeth 33 of the gear 31 and the power is now transmitted from the countershaft to said gear 31 and to the main shaft 11. Next, while leaving the gears within the main housing 3 in the position just indicated, the sleeve 99 may be moved rightwardly and the countershaft driven at a speed one-half step greater than that associated with said third position and the fourth position is thereby attained. This series may be repeated through the leftward position of the sleeve 28 by which the gear 24 is locked to the main shaft 11, the rightward position of the sleeve 14 by which the gear 19 is locked to the main shaft and the leftward position of the sleeve 14 by which a direct drive is attained between the shaft 7 and the shaft 11. In this latter case, movement of the sleeve 99 into its rightward position effects a driving of the gear 8 by the gear 54 and functions as an overdrive In the foregoing description, it has been assumed that the gears within the main housing 3 are not supplied with synchronizers, but it will be appreciated that they may be so supplied if desired without changing the nature of the invention.

Attention is now directed to the synchronizer shown in connection with the auxiliary gears.

With the clutch teeth 102 in the position shown in Figures 1, 5 and 8, it will be assumed that the sleeve 99 is to be moved leftwardly to connect the clutch element 84 with the clutch element 94. As the teeth 102 of said sleeve 99 move leftwardly, since row A of teeth 98 is between the teeth 102, row B of teeth 98 is positively aligned in a position to contact the balking surfaces on the teeth 102. For example, the face 121 of the tooth 111 will strike the face 122 of the tooth 106 and thereby arrest further movement of the sleeve leftwardly so long as the teeth 102 are moving in one circumferential direction, downwardly as appearing in Figure 8 and indicated by the arrow, at a rate slower than the corresponding movement of the teeth 95. The gear ratio relationships in this embodiment between the gear 88 and the clutch element 94 and the clutch element 84 are such that the gear 88 is always going slower than the clutch element 94 regardless of which way the sleeve 99 is positioned or moving. Of course, where the ratios are such that the supplementary elements function as an overdrive split of the main gears (the present embodiment constituting an underdrive split), then the gear 88 will always be going faster than the clutch element 94 regardless of the position of the sleeve 99. In such case, of course, the angles of the contacting blocking faces will be reversed. Initial leftward movement of the sleeve 99 will act through the spring 115 to move the synchronizing ring 97 into light engagement with the surface 85. As the teeth 102 meet the teeth of row B, the synchronizing ring 97 will be further urged leftwardly and its inner surface 96 will press more firmly against the adjacent surface 85 of the clutch element 94 to synchronize its speed with that of the teeth 102 in a known manner.

As soon as the speeds of the teeth 95 and the teeth 102 are substantially synchronized, continuing leftward pressure on the sleeve 99 will cause the teeth 102, which by this time have assumed the position shown in broken lines in Figure 8 and are therefore clear of row A of the blocking teeth 98, to move circumferentially with respect to the teeth 95 in a direction downward as shown in Figure 8 and thus to assume the position shown in broken lines in Figure 9. Continuing leftward pressure on said sleeve 99 will move the teeth 102 into the position shown in solid lines in Figure 9.

Upon moving the sleeve 99 from its leftward position to the rightward position, the action starts with the parts in the position shown in solid lines in Figure 9. In this position, the left hand row B of teeth 98 are engaged between the teeth 102 and hence the right hand row A of the teeth 98 are in blocking position. As the teeth 102 move rightwardly they assume the position shown in broken lines in Figure 9 and are blocked until the rotation of said teeth 102 and that of teeth 92 are substantially synchronized. When such occurs, continuing rightward pressure on said teeth 102 will move same upwardly, as appearing in Figure 9, with respect to the blocking teeth 98 in row A, whose rotation is locked by the friction surfaces 90 and 93 to rotation at the same speed as the teeth 92 and the parts are then in the position shown in broken lines in Figure 8. Continuing rightward pressure on the sleeve 99 then moves the parts into the position shown in solid lines in Figure 8 and the shift is completed.

It will be recognized in the shifting of the supplementary elements that with the clutch disconnected the synchronizer unit used therewith needs only to change the speed of rotation of the drive shaft 83 to bring the clutch element 84 into synchronism with either the clutch element 94 or the gear 88. Since this is a relatively small shaft and hence possessed of low inertia, a relatively small synchronizer is adequate to effect this result and even a small synchronizer will provide the necessary synchronism within an extremely short period of time. The shift of the supplementary gears may thus be accomplished very quickly.

Accordingly, a device has been provided meeting the objects and purposes above set forth.

While a particular embodiment of the invention has been selected for illustrative purposes, it will be apparent to persons acquainted with apparatus of this general type that many variations may be made from the particular form here shown and that the claims should be construed as including such variations excepting as said claims by their own terms expressly require otherwise.

I claim:

1. In a change speed gear set, the combination comprising: an intermediate shaft and a first gear on said intermediate shaft; a coaxial main shaft having other gears thereon and a countershaft including gears connecting said first gear with said main shaft in a plurality of selectable gear ratios, said countershaft having an extension extending beyond said first gear and at least partially coextensive with said intermediate shaft; a drive shaft; a second gear affixed to said extension for rotation therewith; a third gear mounted on said intermediate shaft for rotation thereon and in constant mesh with said second gear; shiftable means driven by said drive shaft and selectively connectible to one of said first and third gears for causing rotation thereof.

2. In a change speed gear set, the combination comprising: an intermediate shaft and a first gear on said intermediate shaft, a coaxial main shaft having other gears thereon and a countershaft including gears connecting said first gear with said main shaft in a plurality of selectable gear ratios, said countershaft having an extension extending beyond said first gear and at least partially coextensive with said intermediate shaft; a second gear fixed to said extension for rotation therewith; a clutch element fixed to said intermediate shaft for rotation therewith; a third gear coaxial with said intermediate shaft and rotatable with respect thereto, said second gear and said third gear being in constant driving relationship with each other; a drive shaft; and means alternately driving said clutch element and said third gear at the will of an operator from said drive shaft.

3. In a change speed gear set, the combination comprising: an intermediate shaft and a first gear on said intermediate shaft, a coaxial main shaft and a countershaft including gears connecting said first gear with said main shaft in a plurality of selectable gear ratios, said countershaft having an extension extending beyond said first gear and at least partially coextensive with said intermediate shaft; a second gear fixed to said extension for rotation therewith; a first clutch element fixed to said intermediate shaft for rotation therewith; a third gear coaxial with said intermediate shaft and rotatable with respect thereto and having clutch teeth thereon; said second gear and said third gear being in constant driving relationship with each other; a drive shaft having a second jaw clutch element formed on the end thereof and arranged coaxially with said intermediate shaft; an internally toothed sliding sleeve, one portion of the internal teeth thereon being in constant engagement with the teeth of said second jaw clutch element and another portion of internal teeth of said sleeve being in alternating engagement with teeth on said first clutch element and the clutch teeth on said third gear; and manually operable means for axially moving said sleeve at the will of an operator.

4. In a change speed gear set, the combination comprising: an intermediate shaft and a first gear on said intermediate shaft, a coaxial main shaft having other gears thereon and a countershaft including gears connecting said first gear with said main shaft in a plurality of selectable gear ratios, said countershaft having an extension extending beyond said first gear and at least partially coextensive with said intermediate shaft; a second gear fixed to said extension for rotation therewith; a first clutch element fixed to said intermediate shaft for rotation therewith; a third gear coaxial with said intermediate shaft, rotatable with respect thereto and having a row of clutch teeth thereon and a row of gear teeth thereon, the teeth of said second gear and the row of gear teeth of said third gear being in constant driving relationship with each other; a drive shaft having a second jaw clutch element formed on the end thereof and arranged coaxially with said intermediate shaft; an internally toothed sliding sleeve having two sets of axially spaced internal clutch teeth, one set of internal clutch teeth thereon being in constant engagement with the teeth of said second jaw clutch element and the other set of internal clutch teeth of said sleeve being in alternating engagement with clutch teeth on said first clutch element and with the row of clutch teeth on said third gear; and manually operable means for axially moving said sleeve at the will of an operator.

5. In a change speed gear set, the combination comprising: an intermediate shaft and a first gear on said intermediate shaft, a coaxial main shaft having other gears thereon and a countershaft including gears connecting said first gear with said main shaft in a plurality of selectable gear ratios, said countershaft having an extension extending beyond said first gear and at least partially coextensive with said intermediate shaft; a first toothed element fixed to said intermediate shaft for rotation therewith; a second toothed element coaxial with said intermediate shaft and rotatable with respect thereto, means providing a constant driving relationship between said second element and said extension of said countershaft; a drive shaft; and means alternately driving said first element and said second element at the will of an operator from said drive shaft.

6. In a change speed gear set, the combination comprising: a drive shaft; an intermediate shaft having a first gear fixed for rotation with said intermediate shaft, a second gear mounted on said intermediate shaft for rotation thereon; a main shaft having other gears thereon; a countershaft, means providing a driving relationship between said countershaft and each of said first and second gears, said countershaft being adapted to connect each of said first and second gears with said main shaft in a plurality of selectable gear ratios, means alternately driving said first gear and said second gear from said drive shaft at the will of an operator.

References Cited in the file of this patent
UNITED STATES PATENTS

| | | |
|---|---|---|
| 2,115,390 | Lasley | Apr. 26, 1938 |
| 2,464,479 | Avila | Mar. 15, 1949 |
| 2,571,474 | Ochs | Oct. 16, 1951 |
| 2,619,210 | Voight | Nov. 25, 1952 |
| 2,633,759 | Warsaw | Apr. 7, 1953 |